Sept. 12, 1961 V. GUARNASCHELLI 2,999,486
MEANS FOR INCREASING FUEL COMBUSTION EFFICIENCY
IN INTERNAL COMBUSTION ENGINES
Filed May 25, 1960
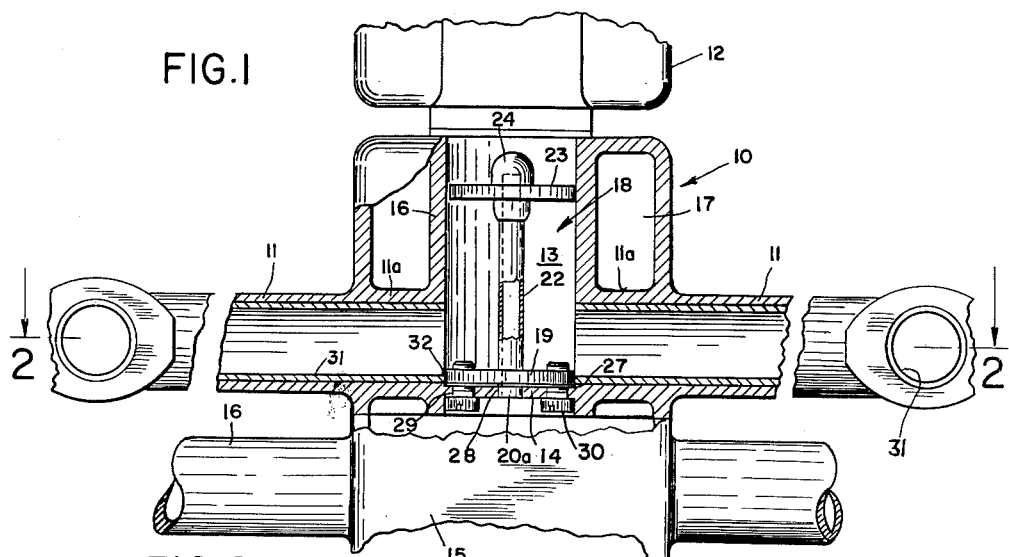
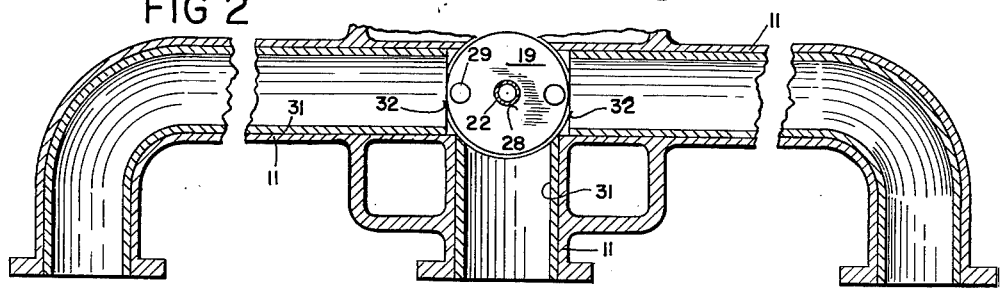
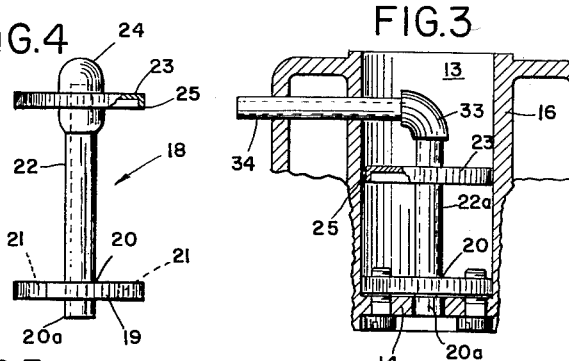
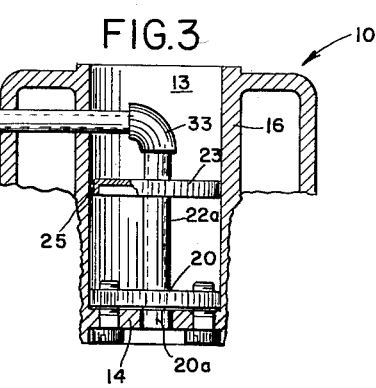
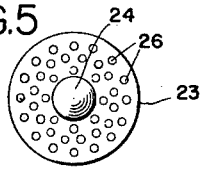
INVENTOR.
VINCENT GUARNASCHELLI
BY *J. Ledermann*
ATTORNEY

United States Patent Office 2,999,486
Patented Sept. 12, 1961

2,999,486
MEANS FOR INCREASING FUEL COMBUSTION EFFICIENCY IN INTERNAL COMBUSTION ENGINES
Vincent Guarnaschelli, Alton Ave., Greenlawn, N.Y.
Filed May 25, 1960, Ser. No. 31,601
6 Claims. (Cl. 123—122)

This invention relates to internal combustion engines, and more particularly to such as are used in automotive vehicles, a primary object of the invention being the attainment of more efficient fuel utilization so that increased power may be obtained for a given fuel consumption rate or a given power output may be obtained at a substantially lower rate of fuel consumption.

Fuel efficiency in internal combustion engines on automotive vehicles is generally reduced owing to the cooling of fuel mixture in its passage from the carburetor to the cylinder whereby a less effective burning of the mixture results in the cylinder, as is well known. Condensation of a portion of the vaporized or atomized fuel on its way to the cylinder reduces the proportion of fuel in the air-fuel mixture thereby altering the ratio of fuel to air from the ratio determined by the carburetor setting.

Attempts have been made to heat the fuel mixture as it leaves the carburetor and before it enters the intake manifold or conduits on its way to the cylinders, with a small degree of reduction in the condensation of fuel at the cylinders. The structure provided therefor consists of having exhaust gases led into a housing which is mounted directly under a housing into which the carburetor discharges and from which the intake conduits lead to the cylinders. The present invention improves upon this structure by adding an insert into the chamber of the latter housing whereby the heat provided by the exhaust gases is utilized to very substantially heat the chamber with consequent heating of the discharged mixture. As a result the mixture arrives at the cylinders with a minimum of cooling and with consequent higher efficiency for ignition.

The present invention further improves upon the efficiency of ignition by providing additional heat conducting means in the conduits of the intake manifold between the above-mentioned chamber and the cylinders.

The above as well as additional objects and desirable results will be clarified in the following description wherein reference numerals refer to like-numbered parts in the accompanying drawings. It is to be noted that the drawing is intended primarily for the purpose of illustration and that it is therefore neither desired nor intended to limit the invention necessarily to any or all of the exact details shown or described except insofar as they may be deemed essential to the invention.

Referring briefly to the drawing, FIG. 1 is an elevational view, with parts broken away and partly in section, showing some of the manifold conduits and exhaust conduits and the housings into which the carburetor and the exhaust gases discharge.

FIG. 2 is a sectional view taken on the line 2—2 of FIG. 1.

FIG. 3 is a reduced fragmentary view similar to FIG. 1 except that it shows a modified form of the insert embodied in the present invention.

FIG. 4 is an elevational view of the insert of FIG. 1, per se.

FIG. 5 is a plan view of the said insert.

Referring in detail to the drawing, the numeral 10 indicates a housing from which the intake conduits 11 lead into the various cylinders of the engine. The carburetor of the engine is denoted by the numeral 12, and it is mounted on the housing 10 in the usual manner so that the fuel mixture is discharged therefrom into the cylindrical chamber 13 of the housing 10. The housing 10 has a floor 14 at the bottom of the chamber 13 which seals the chamber off from exhaust gases in the housing 15 therebelow. The exhaust gases circulate to some extent around the portions 11a of the conduits 11, which are positioned in the annular space of the housing 10, shown at 17, surrounding the wall 16 of the chamber 13. However, the best that the heat from the exhaust can do is to heat or warm up the wall 16 as well as, of course, the floor 14. This imparts a degree of warming to the intake mixture from the carburetor 12, but since the passage of the intake through the chamber 13 past the floor 14 and into the conduit 11 is free and clear, only a small portion of the intake mixture comes into contact with the walls of the said passage.

In order to very substantially heat the intake mixture as it leaves the carburetor, as well as to cause a more thorough mixing of the mixture while it is being thus heated, the following provision is made. An insert 18 is provided in the chamber 13. This insert consists of a base 19 having an axial opening 20 therethrough as well as two diametrically spaced threaded holes 21. A hollow tube 22 of a suitable metal having a high heat conductivity, such as, for example, brass or copper, has its lower end secured in the axial opening 20 with the extremity 20a preferably projecting through the bottom surface of the base. The tube may be secured in the base and rigid therewith in any desired manner, to provide an airtight fit between the tube and the wall of the opening 20.

Axially secured to the tube 22 at or near the top thereof is a disc 23 provided with a relatively large number of small perforations such as, for example, of a diameter of thirty–forty one-thousandths of an inch. In the form of the device illustrated in FIGS. 1-2 and 4-5, the open upper end of the tube is sealed by a cap 24; it may of course be sealed by any other means or in any desired manner. Preferably, the perforated disc 23 has a depending circumferential flange or apron 25. The diameter of the disc 23 is slightly less than the diameter of the chamber 13.

The insert 18 is mounted in the chamber 13 with the base 19 registering on the floor 14 with, if desired, a copper or other metallic gasket 27 therebetween, with the lower end 20a of the tube projecting into a hole 28 drilled axially through the floor 14. Diametrically opposed holes 29, complementary to the holes 21 in the disc 19, are drilled in the floor to accommodate attaching screws 30, which firmly secure the insert in place.

The operation of the invention as so far described, in achieving an increased heating and mixing of the intake mixture from the carburetor, with the consequent beneficial results in operation of the engine, is as follows. As the exhaust gases heat the floor 14, heat in the floor rises in the tube and also heats the disc 23, by conduction through the metal of the tube. Incidentally, all parts of the insert, including the base 19 and the disc 23 as well as the cap 24, are made of the same or similar high heat conducting material. In addition to heating of the insert by conduction from the floor 14, the heat from the exhaust gases below the floor 14 rises upward through the passage in the tube to further heat not only the tube but also the disc 23 and the cap or seal 24 at the top thereof. The increase in heating, of both the tube and the disc, is very substantial. As the intake gas mixture is then sucked through the perforated disc 23 and around the edge thereof, it is accordingly heated and at the same time further atomized or vaporized. As a consequence is reaches the cylinders in a better state of vaporization and mixing for more efficient combustion.

The provision of the apron 25 on the disc 23 further adds to the heating of the mixture, in that heat tends to be trapped under the disc within the confines of the apron.

In order even further to assure the arrival of the fuel mixture at the cylinders in a condition best suited for combustion and with a minimum of cooling en route, the conduits 11 may be provided with copper linings 31 which may even be inserted loosely, that is, without adhesion to the inner walls of the conduits. By having the ends 32 of these linings, which are positioned in the openings through the wall 16 into the conduits 11, in actual contact with the base 19, heat also passes from the base into the linings. Instead of complete tubular linings, they may even be in the form of strips, not shown, laid on the floor of the conduits.

In the modification shown in FIG. 3, parts which are identical to those above described bear the same reference numerals and those which are substituted for other parts previously described bear the same numeral followed by the suffix "a." Here the tube 22a has the disc 23 secured in a lower position on the same, and instead of being sealed at the top it is open and connected by an elbow 33 to a pipe 34 which leads through suitable holes in the housing 10 to the outside air, the end of the pipe 34 being open. In this case heated exhaust gas actually moves through the tube and pipe, and as a consequence of the circulation of the hot gas the tube and pipe as well as the disc are further heated, to a higher temperature.

Obviously, modifications in form or structure may be made within the scope of the appended claims.

The invention having thus been described, what is claimed and desired to be secured by Letters Patent is as follows:

1. In an internal combustion engine which includes an intake manifold housing enclosing an upright cylindrical chamber open at the top upon which is mounted a carburetor to discharge fuel mixture into the chamber and below which is mounted an exhaust manifold housing to heat the chamber, said chamber having a floor, provided with an axial passage therethrough, the improvement consisting of a high heat conducting upright metallic tube mounted in said chamber and registering in said passage, a perforated disc mounted on the tube between the upper and lower ends of the tube, said disc having a depending circumferential flange, the upper end of the tube having means thereon obstructing passage of exhaust gases from the exhaust manifold housing into the chamber.

2. A device according to claim 1, wherein said means comprises a tubular extension extending laterally from the upper end of said tube through an opening in the wall of the intake manifold and terminating outside said wall, the outer extremity of said extension being open.

3. A device according to claim 1, wherein the intake manifold housing has conduits leading from said chamber to the engine cylinders, said conduits being provided with high heat conducting metallic lining members.

4. A device according to claim 3, said tube having an enlarged base surrounding the same and in contact with said floor, the ends of said lining members adjacent said chamber being positioned in contact with said base.

5. In an internal combustion engine which includes an intake manifold housing enclosing an upright cylindrical chamber open at the top upon which is mounted a carburetor to discharge fuel mixture into the chamber and below which is mounted an exhaust manifold housing to heat the chamber, said chamber having a floor provided with an axial passage therethrough, the improvement consisting of a high heat-conducting metallic insert mounted in said chamber comprising a base having an axial passage therethrough aligned with said first-named axial passage, an upright metallic tube mounted in the chamber and registering in said passages, means for securing the base to said floor and for sealing the space between the base and the floor, the upper end of the tube having means thereon obstructing passage of exhaust gases from the exhaust manifold housing into the chamber, said tube having a disc thereon positioned between the ends of the tube, the intake manifold housing having conduits leading from said chamber to the engine cylinders, said conduits being provided with high heat conducting metallic lining members.

6. A device according to claim 5, the ends of said lining members adjacent said chamber being positioned in contact with said base.

References Cited in the file of this patent

UNITED STATES PATENTS

| | | |
|---|---|---|
| 842,170 | Bryant et al. | Jan. 29, 1907 |
| 1,990,662 | Moore | Feb. 12, 1935 |
| 2,611,353 | Allday | Sept. 23, 1952 |
| 2,643,647 | Meyer et al. | June 30, 1953 |
| 2,651,507 | Heinecke | Sept. 8, 1953 |